United States Patent [19]

Latsch et al.

[11] 4,327,681

[45] May 4, 1982

[54] INTERNAL COMBUSTION ENGINE HAVING A MAIN COMBUSTION CHAMBER AND AN IGNITION DEVICE INSERTED INTO AN IGNITION CHAMBER

[75] Inventors: Reinhard Latsch, Vaihingen; Hans Schlembach, Mühlacker; Dieter Scherenberg, Stuttgart, all of Fed. Rep. of Germany

[73] Assignee: Robert Bosch GmbH, Stuttgart, Fed. Rep. of Germany

[21] Appl. No.: 56,666

[22] Filed: Jul. 11, 1979

[30] Foreign Application Priority Data

Jul. 18, 1978 [DE] Fed. Rep. of Germany ....... 2831452

[51] Int. Cl.³ ............................................. F02B 19/08
[52] U.S. Cl. .................................. 123/260; 123/254; 123/263; 123/293
[58] Field of Search ............... 123/254, 260, 262, 263, 123/273, 286, 293, 290, 268, 169 P, 169 PA, 169 EL, 41.31, 41.32; 313/143

[56] References Cited

U.S. PATENT DOCUMENTS

| | | | |
|---|---|---|---|
| 779,778 | 1/1905 | Hagar | 123/293 |
| 988,785 | 4/1911 | Jones | 313/143 |
| 2,127,512 | 8/1938 | Harper, Jr. | 123/169 P |
| 2,171,929 | 9/1939 | Gazda | 313/143 |
| 2,855,908 | 10/1958 | Pflaum | 123/262 |
| 3,304,922 | 2/1967 | Hideg | 123/260 |
| 4,170,979 | 10/1979 | Latsch | 123/260 |
| 4,218,992 | 8/1980 | Latsch et al. | 123/293 |

*Primary Examiner*—Charles J. Myhre
*Assistant Examiner*—Andrew M. Dolinar
*Attorney, Agent, or Firm*—Edwin E. Greigg

[57] ABSTRACT

An internal combustion engine having an ignition chamber forming a closed circular cylinder and communicating via at least one transfer channel with a main combustion chamber with the ignition chamber cylindrical wall being controlled by means of an annular thermal pipe to a virtually constant, high temperature and protected against a rapid cooling toward cooled parts of the internal combustion engine and against overheating. An ignition device inserted into the ignition chamber, with an electrode, forms a spark gap toward the cylindrical wall of the ignition chamber in the region between the middle of the ignition chamber and the transfer channels. To improve the stability of the electrode, the electrode is provided with a heat conductor so as to provide more severely leaning of the fuel-air mixture to be ignited while avoiding glow sparking and reducing the emission of noise.

27 Claims, 8 Drawing Figures

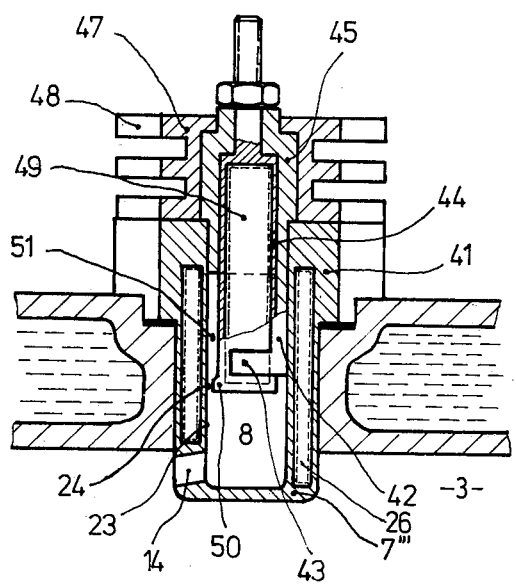
FIG. 7
FIG. 8
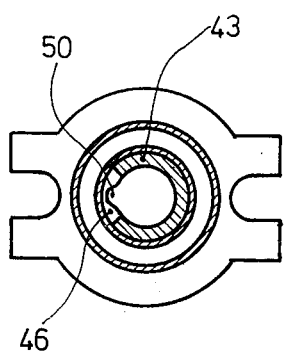

INTERNAL COMBUSTION ENGINE HAVING A MAIN COMBUSTION CHAMBER AND AN IGNITION DEVICE INSERTED INTO AN IGNITION CHAMBER

BACKGROUND OF THE INVENTION

The invention relates to an internal combustion engine. In known internal combustion engines of a similar type, when they are operated with a fuel-air mixture which must be externally ignited, the disadvantage arises that this mixture ignites poorly, especially when it is kept lean in fuel. This causes a nonuniform torque output of the engine. Various attempts have been made to attain a sufficiently positive ignition and reaction of the fuel and air with each other while keeping the proportion of fuel as low as possible, with the intention being to attain a mixture enrichment near the ignition point in the ignition chamber by means of stratification. Beyond this, raising the temperature level in the ignition chamber permits an increase in the ignitability of the lean fuel-air mixture. However, the occurrence of spontaneous ignition and premature wear because of overly high temperatures must be avoided.

In a known apparatus, the temperature of the ignition chamber wall was controlled with this purpose in mind. This is accomplished by using a thermal pipe surrounding the ignition chamber which, so long as the ignition chamber is cold, prevents the immediate conduction of the heat produced there away to the cooled chambers of the internal combustion engine and assures that an increased heat conduction to the cooled walls of the internal combustion engine only appears at high temperatures which can be set as needed.

In this known apparatus, it was further proposed to permit the ignition spark gap to skip over between one electrode and the wall of the ignition chamber within the boundary layer. However, an increased leaning of the operational mixture and thus an increase in the wall temperature of the ignition chamber required for positive ignition, using spark plugs having hook-shaped electrodes, causes excessive overheating of the electrodes and glow sparking with subsequent thermal destruction of the plug. Also, a screw-inserted spark plug acts with the metal housing surrounding the ceramic part of the spark plug as a heat sink with respect to the ignition chamber, so that in the conventional spark plug, the temperature level in the area of the ignition electrodes is lowered in a disadvantageous manner. In the known device, the spark plug is disposed diametrically opposite the exit port of the transfer channel. In such an arrangement and with a high ratio of length to cross-sectional area of the ignition chamber, severe acoustical fluctuations have been found to occur upon the expansion following ignition.

In ignition chambers which must be supplied from the main combustion chamber with fresh fuel-air mixture, there is the problem of gas exchange, i.e., the problem of furnishing a fresh fuel-air mixture, preferably enriched and free of remnant gas, to the ignition location at the instant of ignition, in order to obtain positive ignition at all operational ranges. Various proposals have been made to this end, which are intended to cause a flushing effect of the ignition chamber after expansion has taken place upon the arrival of the fresh fuel-air mixture.

It has also been proposed to place the ignition spark gap directly at the entrance of the transfer channel into the combustion chamber (German Offenlegungsschrift No. 25 038 11), where it is assured that a fresh fuel-air mixture is present at the instant of ignition. However, this device has the disadvantage that because of the long electrode freely extending into the combustion chamber and because of the high conversion energy at the ignition location, this electrode is exposed to such high thermal stresses that it is immediately destroyed.

OBJECT AND SUMMARY OF THE INVENTION

The internal combustion engine in accordance with the invention has the advantage over the prior art in that an ignition towards an optimally heated wall is possible at a location in which a sufficient supply of fresh fuel-air mixture is assured. The remnant gas components still remaining are displaced by the entering fresh fuel-air mixture into the ignition chamber at its rearmost point remote from the ignition location. The overheating of the electrode is avoided in an advantageous manner by means of a device for conduction of the heat quantity away from the electrode of the ignition device. The location where ignition takes place also prevents the creation of severe acoustical fluctuations and reduces noise emission. The device in accordance with the invention further permits leaning of the fuel-air mixture to a very high degree.

It is a particular advantage of the invention that a temperature sensor is provided in the wall between the thermal pipe and the ignition chamber and the temperature sensor is connected with a device for influencing the warm-up phase of the internal combustion engine, with the exhaust gas return line, or with the adjustment device for ignition timing. As a result, all the factors which affect the buildup of temperature in the ignition chamber and the satisfactory combustion of the fuel-air mixture in accordance with this temperature are taken into consideration, so that positive ignition is obtainable, with the most extensive possible leaning, in all operational ranges.

The invention will be better understood as well as further objects and advantages thereof become more apparent from the ensuing detailed description of preferred embodiments taken in conjunction with the drawings.

BRIEF DESCRIPTION OF THE DRAWINGS

FIG. 7 is a longitudinal sectional view of the adjacent chamber in which the ignition device has a reinforced middle electrode, which contains a heat conduction body; and FIG. 8 is a sectional view through the embodiment of FIG. 7.

DESCRIPTION OF THE PREFERRED EMBODIMENTS

Figure 1:
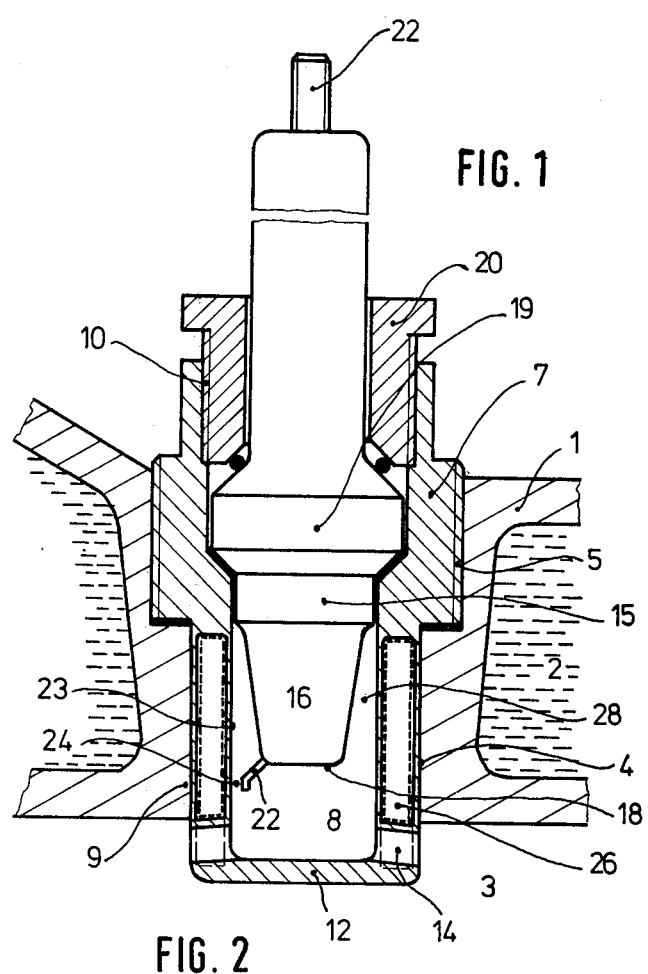
FIG. 1 is a longitudinal sectional view of a first embodiment of the invention provided with an electrode of the ignition device which is jacketed up to just before the ignition location.

FIG. 1 shows a portion of a combustion chamber wall 1 of an internal combustion engine having cooling chambers 2 through which cooling fluid flows. The combustion chamber wall 1 has, at the point shown, a stepped bore having portions 4, 5 whose diameter decrease toward the main combustion chamber 3 and whose upper portion 5, having a larger diameter, is provided with an interior thread. Screwed into this stepped bore is an insert 7, which contains an ignition chamber 8, which forms an elongated, closed circular cylinder. The insert 7 is fitted with its lower portion 9 into the stepped bore portion 4 and has a screw element 10 with which it is screwed into the upper stepped bore portion 5.

Figure 2:
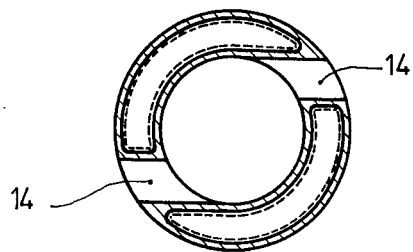
FIG. 2 is a sectional view through the embodiment of FIG. 1 in the region of the transfer channels.

The lower portion 9 of the insert 7 projects to such an extent into the main combustion chamber 3 that two transfer channels 14 from the ignition chamber 8 can freely enter into the main combustion chamber 3 directly in front of the front face 12 oriented toward the main combustion chamber 3. The transfer channels 14 extend substantially radially toward the axis of the ignition chamber 8 and discharge tangentially into the ignition chamber 8. This may be seen in FIG. 2, which shows a section through the transfer channels 14.

The opposite second wall on the front face of the ignition chamber is formed by a ceramic body 15, from which a frustoconical part 16 projects into the ignition chamber 8 ending there with the circular surface of the tip 18 in a region of the ignition chamber 8 which is in the lower half of the axial extension of the ignition chamber 8. The circle at the base of the frustoconical part 16 thereby entirely fills the cross-section of the adjacent chamber.

The ceramic body 15 is fixed in the insert 7 with a shoulder-like extended portion 19 of the ceramic body and with a screw casing 20, which is screwed into the screw element 10. Thus, the ignition chamber 8 is tightly closed. An electrode 22 extends coaxially in the manner of a spark plug through the ceramic body 15 into the frustoconical part 16 where it exits at the rim of the circular tip 18 to the side toward the cylindrical wall 23 of the ignition chamber 8 which forms the other electrode and there forms a spark gap 24 with the cylindrical wall 23. The spark gap 24 is located in the lower half to lower third of the ignition chamber length. The ceramic body 15 with the electrode 22 forms the ignition device for a fuel-air mixture introduced into the ignition chamber 8.

Disposed over the entire axial length of the cylindrical wall 23 in the wall of the insert 7 is an annular thermal pipe 26 which has a recess only at the passage of the transfer channels 14 therethrough. The thermal pipe 26 is provided in a conventional manner with an evaporator element, a condensation element and a transport element which supplies the condensed evaporator medium even against the force of gravity by making use of the known effect of capillary action. To this end, the walls of the thermal pipe 26 are fissured in the manner of capillaries, which is obtainable, for example, by means of an embedded heat-resistant net or by means of porous coatings on the walls or by cutting a capillary structure into the surface. Thermal pipes are known per se and need not be described as to their function in further detail here.

The thermal pipe is filled with an evaporator medium which is selected such that the desired maximum temperature can be maintained with respect to the geometric layout of the ignition chamber, combustion conditions, and cooling conditions at the cylindrical wall 23 of the ignition chamber 8.

In the embodiment shown in FIG. 1, the thermal pipe 26 extends up to the region into which the transfer channels 14 discharge over the entire length of the cylindrical wall 23. By means of the thermal pipe 26, a heat insulation is attained during warm-up of the internal combustion engine such that the heat arising in the ignition chamber 8 during combustion can flow off to the cooling chambers 2 of the internal combustion engine only to a very limited extent. In the cold state, below the vaporization temperature of the evaporator medium, the increased heat conductivity of a thermal pipe is made ineffective, so that, in this state, the thermal pipe acts as an insulator. Only under conditions of severe heating does the thermal pipe come into effect and then, in the operationally warm state, prevents the cylindrical wall from overheating. Thus very rapid heating of the ignition chamber walls and the capacity to ignite even a very severely leaned fuel-air mixture are obtained.

The fuel-air mixture introduced into the main combustion chamber 3 is compressed during the compression stroke of the piston (not shown here) and introduced as well into the ignition chamber 8 via the transfer channels 14. The remnant gas mixture which remains there after the previous combustion process, after expansion and expulsion of the other remnant gases from the main combustion chamber is displaced by the entering fresh mixture, which because of the tangential discharge of the transfer channels 14 takes the form of a rising vortex, into the annular portion of the ignition chamber surrounding the frustoconical part 16. This annular portion may thus be viewed as a reception chamber 28 into which the remnant gas is pushed away from the ignition location in the region of the spark gap 24 by means of the fresh charge.

At the spark gap 24, fresh fuel-air mixture is therefore present which is enriched with fuel in the area near the wall because of the rapid rotation. Thus, because the spark gap 24 is provided in the lower half of the ignition chamber 8, it is assured that a fuel-air mixture, to a great extent free of remnant gas, is present in the area of the spark gap before the instant of ignition. The closer the spark gap 24 is located to the entry point of the fresh mixture through the transfer channels 14, the better the ignitability of the mixture, but also, the higher are the thermal stress and the demands placed on the heat conduction. Simultaneously, however, part of the preheating effect of the hot walls is lost to the introduced mixture. An advantageous solution to this problem is a spark gap location in the region of the lower half to the lower third, associated with the transfer channels 14. Because of the slowing of the air velocity down to zero in the wall boundary layer, very good preconditions are created in this region for the burning of the mixture because the spark is deflected only to a very limited extent by the flowing mixture. As a result of the embodiment described above, it is possible to ignite even very severely leaned fuel-air mixtures satisfactorily with a low expenditure of ignition energy.

The heat transferred onto the electrode 22 during combustion in the ignition chamber 8 is very quickly absorbed by the frustoconical part 16 of the ceramic body 15 and conducted thereby onto the cooled walls of the internal combustion engine. In an advantageous manner, the conically shaped part is, for this purpose, disposed at the ignition location and is specially formed in a frustoconical shape, so that heat can be transported through this ceramic body part without forming localized clusters or pockets of heat. As a result of this shape, a minimum of heat-accepting surface is attained in proportion to the heat-conducting cross section. Advantageous proportions for the length of the frustoconical part 16 to its diameter at the foot, are 1:1, or, for the surface of the circular point to the surface of the circle at the foot, 1:0.5.

The electrode 22 extending at an approximate angle less than 45° to the axis of the ignition chamber 8 is bent slightly at its end in an advantageous manner, so that if the electrode burns off, it has no substantial effect on the length of the remaining spark gap.

Besides the positive supply of fresh fuel-air mixture to the ignition location, the invention has a further advantage in that warm remnant gases remain in the reception chamber 28 and thus, particularly in the warm-up phase of the engine, contribute to the rapid heating of the cylindrical wall 23 of the ignition chamber 8. The heat given up there to the cylindrical wall 23 is distributed uniformly with the aid of the thermal pipe 26 in the advanced heating phase, so that no localized overheating of the cylindrical wall 23 can occur.

The embodiment of FIG. 1 also enables the prevention of an ignition location on the wall of the ignition chamber 8 opposite the entry ports of the transfer channels 14. In arrangements of that kind, depending on the size of the ignition chamber volume, more or less severe acoustical fluctuations arise, which contribute in large measure to the noise emission of the engine. The nearness of the straight channels to the ignition location also has an advantageous effect in that the flame front leaving the ignition location is rapidly transported to the transfer channels 14, so that a large part of the mixture introduced into the ignition chamber 8 burns there, which leads to particularly good heating of the walls of the ignition chamber during idling and partial load operation.

The combustion is thereafter continued in the main combustion chamber 3, where, by the alignment of the straight channels, combustion can be optimized in the sense of a uniform turnover of the remaining charge in the main combustion chamber 3. This optimization is also obtainable in that the ignition chamber volume is kept as small as possible. It should amount to between 1 and 5% of the final compression volume of the entire combustion chamber. The volume of the reception chamber 28 for the remnant gas, in contrast, should amount to approximately 30-40% of the volume of the ignition chamber 8.

The embodiment according to FIG. 1 has the further advantage that the electrode 22 can be adjusted with resepct to the angular relationship with the entering transfer channels 14 and can be fixed in this position by twisting the screw casing 20 until it is tight. Thus a favorable position for the ignition location or the spark gap 24 can be set with respect to the position of the transfer channels 14.

Figure 3:
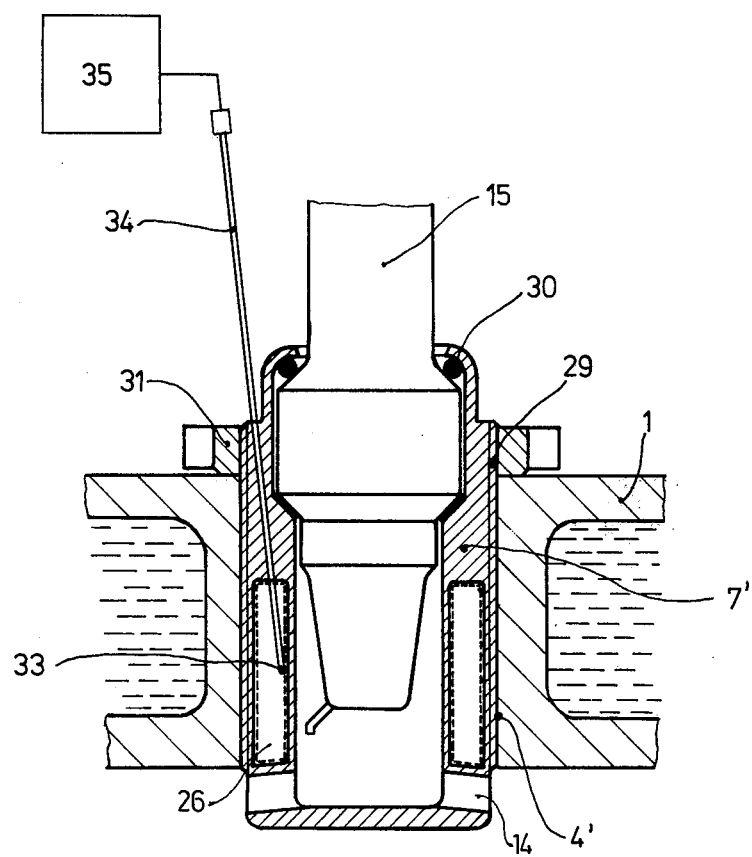
FIG. 3 is a longitudinal sectional view of an embodiment of the adjacent chamber, which is located in a screwed-in insert and is closed on the front face by a spark plug insulator which is fixed by a flange and includes the ignition electrode.

The embodiment in accordance with FIG. 3 is substantially of the same design as the embodiment of FIG. 1. Thus, the above description may be referred to. As to the differences from the embodiment of FIG. 1, the insert 7' in the embodiment of FIG. 3 is formed as a wholly cylindrical part and has on its outer circumference, a threading 29, with which it is screwed into a corresponding threaded bore 4', which passes through the cylinder head wall 1. The ceramic body 15 here, instead of being fixed with the screw casing 20 as in the embodiment of FIG. 1, is fixed by means of a flange 30 on the outer end of the insert 7'.

An alignment of the transfer channels 14 can be undertaken from the outside in a simple manner in the embodiment of FIG. 3 in that the insert 7' is twisted and is fixed in position by a lock nut screwed onto the threading 29 on the outside. A mark can also be added to aid in alignment. Thus, in a very simple manner, the direction of the transfer channels 14 and the jets of flame exiting therefrom, which are intended to ignite the remaining charge in the main combustion chamber 3, can be aligned such that in the main combustion chamber 3, a very favorable, complete combustion takes place while knocking is avoided. The transfer channels 14 are aligned in such a manner with respect to the adjacent combustion chamber wall that the jets of flame exiting therefrom extend approximately parallel to the adjacent walls and close to these walls. In this manner, through slow and continuous combustion while avoiding temperature peaks in the region near the wall, an exhaust gas is obtained which contains relatively few $NO_x$ components. This is very advantageous in that it is just these $NO_x$ components which are removable from the exhaust gas only with great difficulty and yet legal requirements concerning the exhaust gas levels of toxic substances set very strict limits for the $NO_x$ content.

The number of transfer channels 14 is finally a matter of the form of the combustion chambers with which the ignition chamber is associated. With a large amount of fissuring, several such channels will be necessary for uniform burning. In order to still obtain good results in burning, the exit area of all the transfer channels together, divided by the volume of the ignition chamber, should amount to approximately 0.1 $cm^{-1}$. However, if only a single transfer channel is provided, then the most favorable alignment of the channel is that the exiting jet of flame is directed onto the outlet valve. This causes a decrease in the knocking tendency of the engine. The above is also true for the embodiment described in connection with FIG. 1 as well as for the subsequent embodiments.

As in FIG. 1, a reduction of the acoustic fluctuations in the ignition chamber can be accomplished in that the ratio of height to length of the ignition chamber is approximately 1:1 and the volume of the ignition chamber is very small (1-5%) compared with the final compression volume of the main combustion chamber 3. Furthermore, because in the present embodiment the spread of the flame from the ignition location to the transfer channels is accelerated, which has to do with the position of the ignition location combined with the embodiment of a reception chamber 28, there is a very favorable effect on the reduction of noise emission.

Ignition chambers equipped with a thermal pipe such as are described herein can also have a temperature measurement sensor 33 attached to the wall separating the ignition chamber 8 from the thermal pipe 26, with the sensor terminal 34 directed to the outside and connected with a control device 35. The control device 35 processes the temperature signal as a control value for regulating or influencing the fuel-air mixture (during warm-up, for instance), the exhaust gas return, or the ignition device.

If the wall temperature is still too low, then, in order to attain satisfactory arc-through during warm-up, the fuel-air mixture must be enriched, or the return of exhaust gas must be prevented for a time. On the other hand, under conditions which remain the same, the heating of the ignition chamber 8 can be attained more quickly, by varying the ignition angle toward "early". As a result of these measures, the characteristics of the system, already extremely good, can be further improved after engine starting.

Figure 4:
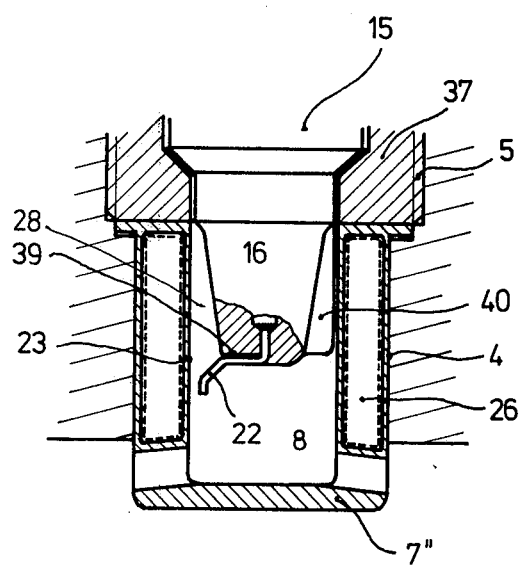
FIG. 4 is a longitudinal sectional view of a third embodiment of the invention, in which the insert, which includes the ignition chamber, is pushed into a bore in the cylinder head and is fixed in position by a screw-insertion piece which supports the ignition device.

FIG. 4 shows a further modified version of the embodiments of FIGS. 1 and 3. Here, instead of an insert 7 having a threading, there is only an insert 7″ which is inserted into the lower stepped bore portion 4. The insert 7″ encloses only the part of the insert 7 of FIG. 1 which contains the cylindrical chamber of the ignition chamber 8 and the thermal pipe 26. In the upper stepped bore portion 5 of the embodiment of FIG. 1, a screw insertion piece 37 is provided which engages the threading of the upper stepped bore portion 5 and fixes the rotary angle position of the insert 7″. The screw-insertion piece 37, at the same time, carries the ceramic holder 15, which can be fixed there in the same manner as in the embodiments of FIG. 1 or FIG. 3. A corresponding illustration in FIG. 4 was omitted.

As in the embodiments of FIGS. 1 and 3 as well, the ceramic body 15 here completely fills the diameter of the ignition chamber 8 at the foot of the conically shaped part 16. In an alternative embodiment, the electrode 22 was guided coaxially through the ceramic body 15, formed rotationally symmetrically, and a groove 39 was provided in the front face at the point of the frustoconical part 16, in which groove the laterally bent middle electrode 22 is embedded, so that only the part of the electrode 22 which projects at an angle of about 45° away from the ceramic body axis and toward the cylindrical wall 23 projects above the contour of the frustoconical part 16.

In this manner, first, the manufacture of the ignition device is simplified, and second, the electrode 22 is also protected in the area of the groove 39 from taking up heat, and the vortex buildup in the ignition chamber 8 is disturbed as little as possible.

Figure 5:
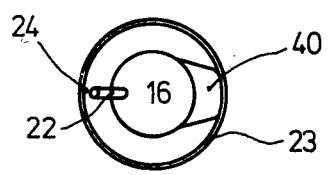
FIG. 5 is a cross-sectional view of the ceramic body surrounding the ignition electrode.
Figure 6:
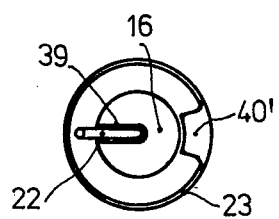
FIG. 6 is a view similar to FIG. 5 of an alternative embodiment of the ceramic body of FIG. 5.

FIG. 6 shows a form of the electrode described above and FIG. 5, in contrast, shows the form of the electrode incorporated in the embodiment of FIGS. 1 and 3.

Furthermore, the frustoconical part 16 of the ceramic body 15 is provided, in the embodiment of FIG. 4, with a strip-like part 40 which extends from the circular foot of the frustoconical part 16 to the circular point and deforms the annular reception chamber 28 into an annular-segment-shaped chamber, because the strip-like part 40 extends up to the cylindrical wall of the ignition chamber 8. In the embodiment of FIG. 4, this strip 40 is set onto the frustoconical part 16 of the ceramic body 15 as can also be seen in FIG. 5. In a technically equivalent manner, on the other hand, a strip 40' can also be set onto the cylindrical wall 23, which then extends up to the frustoconical part 16. This embodiment can be seen in FIG. 6.

Because of this strip-like part 40, there is a calming of the rotary movement of the remnant gases entering into the reception chamber 28. Thus, a reverse flowing turbulence with the fresh mixture components located in the lower portion of the ignition chamber 8 is prevented and also, the heat exchange with the cylindrical wall 23 is lowered. This occurs particularly in the area of the strip 40 or 40', which is located diametrically opposite the position of the spark gap 24. In the remaining areas, the heat transfer to the cylindrical wall 23 is greater because of the greater amount of remnant motion, so that the heating of these wall portions is favored, particularly up to the location at which the spark jumps. Thus, one again attains a more rapid heating of the ignition chamber wall and of the mixture circulating to flush the wall with a reduced heat stressing of the other parts overall.

In the embodiment of FIG. 7, there is provided an insert 7′41 , which, as in the embodiment of FIG. 1, is tightly inserted into stepped bore portions 4, 5 the insert 7‴ has a flange-like upper part 41, which is secured with the aid of spacer bolts or the like, which are not shown. In the same manner as insert 7 of the embodiment of FIG. 1, this insert 7‴ has an annular thermal pipe 26 and a transfer channel 14, which connects the main combustion chamber 3 with the ignition chamber 8 in the interior of the insert 7‴. As the differences from the embodiment of FIG. 1, a greatly thickened electrode 44 is provided as the middle electrode, which, however, is also held in a ceramic body 45, which is embedded in a cooling body 47 connected with the flange-like upper part 41. The cooling body 47 has cooling ribs 48 in order to improve the heat transfer to the surrounding air.

The electrode 44 has in its interior a heat-conducting zone 49, which assures an improved heat transfer from heat-accepting parts of the electrode 44 to the heat-emitting parts of the electrode 44 in regions of the cooling body 47. A thermal pipe 26 is advantageously used as the heat-conducting zone, with the characteristics described above. The thick electrode 44 further has, on its end projecting into the ignition chamber 8, a diametrical enlargement 50 which extends toward the cylindrical wall 23 of the ignition chamber 8 and determines the size of the spark gap 24. The spark gap 24 lies, as in the embodiments already described, in the region between the half of the ignition chamber's lengthwise extension and the entry ports of the transfer channels 14. The position between the values of half the ignition chamber length and a third of the ignition chamber length, departing from the entry ports of the transfer channels 14, is advantageous.

As in the embodiments according to FIG. 4 as well, the ceramic body 15 here narrowed down in the form of a strip 42 almost to the end of the electrode 44. There, the strip 42 is enlarged semicircularly, so that near the end of the electrode 44, the ceramic body 15 surrounds the electrode 44 with a semicircular shoulder 43 in such a manner that only within an angular range of about 60° does a free connection remain between the lower portion of the ignition chamber 8 and the thus defined reception chamber 51 in the upper portion of the ignition chamber 8. This free connection may be viewed as a connecting channel 46 between reception chamber 51 and the rest of the ignition chamber 8. Then the spark gap 24 lies in the center of a flow of gas exiting from the reception chamber 51 via the connecting channel 46.

As a result of this arrangement, good flushing of the ignition location is attained for the burned gases still found at first in the ignition chamber 8, which for the most part are displaced into the chamber 51. At the same time, good heating of the ignition chamber wall 23 in the area of the ignition location is attained.

FIG. 8 shows a section through the embodiment of FIG. 7 in the area of the semicircular shoulder.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. An internal combustion engine including a main combustion chamber and having an ignition chamber communicating by means of at least one transfer channel with said main combustion chamber, said ignition chamber comprising a closed end circular cylinder having a cylindrical wall which projects into said main combustion chamber and having said at least one transfer channel exiting from a lower portion of said cylinder wall substantially radially to the axis of said cylinder and tangentially to the cylindrical wall of said cylinder, said cylinder wall forming a first electrode, an ignition device projecting into said ignition chamber coaxially with said cylinder wall including a second electrode having a portion coaxial with said cylinder wall and a portion extending in a direction away from the coaxial portion toward said cylinder wall adapted to ignite toward said cylindrical wall of the ignition chamber, characterized in that said second electrode forms a spark gap with the surface of said cylinder wall in the lower half of said ignition chamber above said transfer channel in said ignition chamber cylindrical wall.

2. An internal combustion engine in accordance with claim 1, wherein said coaxial portion of said second electrode has a large diameter for the purpose of heat conduction, said second electrode including a diametrical enlargement on a lower end thereof, said enlargement forming said spark gap with said ignition chamber wall.

3. An internal combustion engine in accordance with claim 2, wherein said ignition device further comprises a protruding shoulder partially surrounding said second electrode.

4. An internal combustion engine in accordance with claim 2, wherein said second electrode has an interior provided with a zone which conducts heat well.

5. An internal combustion engine in accordance with claim 4 wherein said ignition chamber further comprises a thermal pipe leading to cooled parts located outside said ignition device.

6. An internal combustion engine in accordance with claim 1, said ignition device including a frustoconical ceramic body for retaining said second electrode, said body projecting into said ignition chamber for heat conduction.

7. An internal combustion engine in accordance with claim 6, wherein said ceramic body includes a frustoconical portion having a circular tip, said second electrode being disposed coaxially through said ceramic body and inside said circular tip, toward the outermost edge of said frustoconical portion and terminates at a distance from said ignition chamber cylindrical wall.

8. An internal combustion engine in accordance with claim 7, including a groove within the front face of said ceramic body circular tip and wherein said second electrode is embedded in said groove.

9. An internal combustion engine in accordance with claim 8, wherein said frustoconical portion of said ceramic body has a diameter at its entry point into said ignition chamber that is approximately equal in size to the diameter of said ignition chamber.

10. An internal combustion engine in accordance with claim 1, including a reception chamber for remnant gas in the upper portion of said ignition chamber.

11. An internal combustion engine in accordance with claim 10, including a strip-like part extending over the length of said reception chamber for remnant gas in the axial direction between said second electrode and said cylindrical wall of said ignition chamber, said reception chamber having cross-sectional shape in the form of an open ring, wherein the strip-like part is located diametrically opposite said spark gap.

12. An internal combustion engine in accordance with claim 11, wherein said strip-like part comprises a body of ceramic material adjacent to said second electrode, said body of ceramic material extending to just before the end of said second electrode.

13. An internal combustion engine in accordance with claim 12, wherein said strip-like part is extended in a circumferential direction at its end to form a partially annular shoulder.

14. An internal combustion engine in accordance with claim 12, including an insert having a wall defining said ignition chamber, and a thermal pipe being disposed in said insert wall and with the exception of the area at which at least one transfer channel is provided extends over the entire axial length of said ignition chamber.

15. An internal combustion engine in accordance with claim 1, including an insert, said ignition chamber being located in said insert, said insert being insertable into a cooled wall defining the main combustion chamber of the internal combustion engine, said insert being adapted to permit a change in its rotary position and thus the direction of said at least one transfer channel.

16. An internal combustion engine in accordance with claim 15, wherein said insert is provided with a screw connection and a lock nut for fixedly securing the rotary position of said insert in said main combustion chamber wall.

17. An internal combustion engine in accordance with claim 15, including a screw-insertion piece disposed in enclosing relationship with said ignition device for securing said insert in its rotary position, said ignition chamber having an upper face oriented toward said screw-insertion piece and a ceramic body surrounding said electrode forming said upper face of said ignition chamber.

18. An internal combustion engine in accordance with claim 16, wherein said at least one transfer channel extends approximately parallel to a portion of the main combustion chamber wall adjacent to the exit of said transfer channel.

19. An internal combustion engine in accordance with claim 18, wherein at least one said transfer channel is aligned toward an outlet valve of said main combustion chamber.

20. An internal combustion engine in accordance with claim 1, wherein the ratio of the total transfer channel exit area to the volume of said ignition chamber amounts to approximately $0.1$ cm$^{-1}$.

21. An internal combustion engine in accordance with claim 20, wherein said ignition chamber has 1 to 5% of a final compression volume of the entire combustion chamber.

22. An internal combustion engine in accordance with claim 1 wherein said ignition chamber comprises an insert, a ceramic body disposed within said insert and wherein said second electrode of said ignition device is embedded at least partially in said ceramic body.

23. An internal combustion engine in accordance with claim 22, including a screw-casing for holding said ceramic body, said screw casing being arranged to fix said ceramic body and said second electrode in an adjustable position.

24. An internal combustion engine accordance with claim 23, wherein said screw casing is formed as a cooling body.

25. An internal combustion engine in accordance with claim 5, including a temperature sensor disposed between said thermal pipe and the ignition chamber cylinder wall and a device for influencing at least one of the warm-up of the internal combustion engine, the exhaust gas return, and the ignition connected to said temperature sensor.

26. An internal combustion engine as claimed in claim 1, in which said ignition device includes a ceramic body comprising a frustroconical portion, and a shoulder-like extended portion for conducting heat from said second electrode to said internal combustion engine.

27. An internal combustion engine as claimed in claim 1 or 26 which includes a heat pipe juxtaposed said cylindrical wall which aides in cooling said ignition chamber.

* * * * *